(12) United States Patent
Onfroy et al.

(10) Patent No.: US 10,962,367 B2
(45) Date of Patent: Mar. 30, 2021

(54) MOBILE MASS SUSPENSION SYSTEM COMPRISING MEANS OF CONNECTING THE MOBILE MASS WITH OPTIMISED LINEARITY

(71) Applicants: SAFRAN, Paris (FR); COMMISSARIAT A L'ENERGIE ATOMIQUE ET AUX ENERGIES ALTERNATIVES, Paris (FR)

(72) Inventors: Philippe Serge Claude Onfroy, Argenteuil (FR); Mikael Colin, Grenoble (FR); Thierry Verdot, Saint Egreve (FR)

(73) Assignees: SAFRAN, Paris (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 463 days.

(21) Appl. No.: 16/064,123

(22) PCT Filed: Dec. 22, 2016

(86) PCT No.: PCT/EP2016/082418
§ 371 (c)(1),
(2) Date: Jun. 20, 2018

(87) PCT Pub. No.: WO2017/109093
PCT Pub. Date: Jun. 29, 2017

(65) Prior Publication Data
US 2019/0011260 A1 Jan. 10, 2019

(30) Foreign Application Priority Data
Dec. 23, 2015 (FR) ..................... 15 63264

(51) Int. Cl.
*G01C 19/5769* (2012.01)
*G01C 19/5747* (2012.01)
(Continued)

(52) U.S. Cl.
CPC ..... *G01C 19/5769* (2013.01); *G01C 19/5733* (2013.01); *G01C 19/5747* (2013.01); *G01C 19/5762* (2013.01)

(58) Field of Classification Search
CPC .............. G01C 19/574; G01C 19/5747; G01C 19/5762; G01C 19/5769; G01P 15/0802; G01P 15/097
See application file for complete search history.

(56) References Cited

U.S. PATENT DOCUMENTS

2011/0234206 A1* 9/2011 Kawakubo .............. G01P 15/18
324/162
2014/0299947 A1 10/2014 Jeanroy
2016/0146606 A1 5/2016 Jeanroy et al.

FOREIGN PATENT DOCUMENTS

FR 2 983 574 A1 6/2013
WO WO 2014/177542 A1 11/2014

OTHER PUBLICATIONS

International Search Report dated Mar. 29, 2017 in PCT/EP2016/082418 filed Dec. 22, 2016.
(Continued)

*Primary Examiner* — Herbert K Roberts
(74) *Attorney, Agent, or Firm* — Oblon, McClelland, Maier & Neustadt, L.L.P.

(57) ABSTRACT

A system is disclosed for suspension of a mobile mass, such as an inertial angular sensor, including a connection device including first and second connection elements connected to each other through a connection block and deformable in bending in a mobility plane so as to enable displacements relative to the connection block, of the mobile mass con- (Continued)

nected to the first connection element, and of another element of the system connected to the second connection element such as a support or another mobile mass respectively, along two distinct directions respectively. At least one of the connection elements is formed from two springs, connecting the connection block to the mobile mass or the other element of the system respectively. The connection element thus has improved linearity properties.

15 Claims, 5 Drawing Sheets

(51) Int. Cl.
*G01C 19/5733* (2012.01)
*G01C 19/574* (2012.01)
*G01C 19/5762* (2012.01)

(56) References Cited

OTHER PUBLICATIONS

French Search Report dated Nov. 18, 2016 in FR 1563264 filed Dec. 23, 2015.

* cited by examiner

MOBILE MASS SUSPENSION SYSTEM COMPRISING MEANS OF CONNECTING THE MOBILE MASS WITH OPTIMISED LINEARITY

TECHNICAL DOMAIN

This invention relates to the domain of systems comprising a mass mobile in a plane, such as inertial angular sensors with vibrating resonator(s). Such sensors, known as "discrete mass" sensors, include at least one mobile mass also called a "seismic mass", "test body", or "test mass", forming a resonator oscillating in a mobility plane relative to a frame of the sensor, the movement of which can be analysed to provide information about displacement of the frame in rotation.

These sensors can operate in "gyroscope" and/or "gyrometer" mode and their dimensions can vary. "Gyrometer" mode is based on measuring the Coriolis force applied to the mobile mass under the effect of a rotational displacement of the frame of the sensor, while "gyroscope" mode is based on an angular drift of a direction of oscillation of the mobile mass under the effect of such a rotational displacement.

In particular, these sensors are appreciated because they can be miniaturised and are thus used particularly in the form of micro-electromechanical sensors (MEMS).

The invention also applies to other types of systems that could for example be used to form actuators, switches or resonators.

STATE OF PRIOR ART

In an inertial angular sensor with vibrating resonator(s), the (or each) resonator is in the form of a mobile mass suspended by elastic means from a support such that the mobile mass can oscillate in a plane, hereinafter referred to as the "mobility plane".

A large variety of this type of sensor has been developed. In some of these sensors, particularly sensors designed to be able to operate in "gyroscope" mode, in other words that can be used to measure an angular position directly, the mobile mass has two degrees of freedom in translation in the mobility plane, and one degree of freedom in rotation about its centre of inertia in this same plane. Oscillation of the mobile mass is then maintained by means of actuators acting in two directions, generally orthogonal to each other. Furthermore, a rotational displacement of the sensor frame causes an angular shift in the direction of oscillations of the mobile mass. Therefore this mass must be capable of displacement indifferently in any direction in the mobility plane.

To achieve this, the suspension means of the mobile mass must be compatible with the two degrees of freedom of the mobile mass.

It is also desirable that the force required to maintain oscillation of the mobile mass is linear as a function of the amplitude, to avoid generating a fault that could disturb operation of the sensor.

A second order non-linearity results in a non-zero average force that causes a prestress in the structure of the sensor, while a third order non-linearity results in an isochronism fault that results in an average stiffness dependent on the amplitude, causing a variation in the oscillation frequency as a function of the oscillation amplitude.

The same considerations apply to elastic coupling means used for elastic coupling of the respective displacements of several mobile masses present in some sensors.

In the remainder of this description, the expressions "connection means", "connection device" and "connection element" indifferently designate suspension means, suspension devices or suspension elements and elastic coupling means, elastic coupling devices or elastic coupling elements. It is clear for a skilled person that the concepts of suspension and elastic coupling involve a direct connection between two elements.

PRESENTATION OF THE INVENTION

The purpose of the invention is particularly a system that has connection means with two degrees of freedom, and with at least improved linearity properties, and preferably also with improved isotropy properties.

To achieve this, the invention discloses a system comprising a least one mobile mass and connection means connecting the mobile mass to another element of the system allowing the mobile mass to move in a plane called the "mobility plane", relative to said other element of the system.

According to the invention, the connection means include a first connection device comprising a first connection element connected to the mobile mass, a second connection element connected to said other element of the system, and a connection block connecting the first connection element to the second connection element.

Furthermore, when the mobile mass is in a rest position, the first and the second connection elements are centred with respect to a first plane and a second plane respectively that are orthogonal to the mobility plane and that intersect.

Furthermore the first connection element is deformable in bending in the mobility plane so as to enable relative displacement of the mobile mass relative to the connection block along a first direction orthogonal to the first plane, starting from the rest position, and the second connection element is deformable in bending in the mobility plane to enable relative displacement of said other element of the system relative to the connection block along a second direction orthogonal to the second plane, starting from the rest position.

Furthermore, at least one of the first and second connection elements is formed from at least two springs, each of which having a first end connected to the mobile mass, respectively to said other element of the system, and a second end connected to the connection block.

The configuration of the first connection device imparts good linearity properties thereto, as will become clear from the following description. The invention can thus provide a solution to the problem described above.

It is clear to a skilled person that deformation of the first connection element in bending in the mobility plane induces a displacement of the mobile mass that, to the first order, takes place only along the first direction mentioned above. Similarly, deformation of the second connection element in bending in the mobility plane induces a displacement of the mobile mass that, to the first order, takes place only along the second direction mentioned above.

It should be understood that "relative displacement of the mobile mass relative to the connection block", refers to the possibility for the mobile mass to move within a fixed coordinate system relative to the connection block. Similarly, it should be understood that "relative displacement of said other element of the system relative to the connection block", refers to the possibility for the other element of the system to move within the fixed coordinate system relative to the connection block. In particular, this terminology does not prevent this other element of the system from being fixed to a frame of the system, and therefore that it is the connection block that moves relative to the other element of the system considering a coordinate system fixed relative to the frame of the system.

"Rest position" means a stable position of the mobile mass, that is preferably a position in which the first and second connection elements are not subjected to any bending stress in the mobility plane.

Preferably, the other connection element is also formed from at least two springs, a first end of which being connected to said other element of the system, respectively to the mobile mass, and a second end of which being connected to the connection block.

Thus, in preferred embodiments of the invention, the first connection element is composed of at least two springs capable of deforming in bending in the mobility plane and each having a first end connected to the mobile mass and a second end connected to the connection block; and the second connection element is composed of at least two springs capable of deformation in bending in the mobility plane and each having a first end connected to said other element of the system and a second end connected to the connection block.

The connection element can thus have optimal linearity properties.

Preferably, the springs of the first connection element are similar to each other. The springs of the second connection element are preferably also similar to each other.

In a first preferred embodiment of the invention, each of the springs in at least one of the first and the second connection elements is in the form of a straight leaf or beam.

The number of springs in each of the first and the second connection elements may be equal to two.

As a variant, the number of springs in at least one of the first and second connection elements may be greater than or equal to three.

An increase in the number of springs can increase the stiffness of the connection device.

In a second preferred embodiment of the invention, at least one of the first and second connection elements extends between two corresponding extensions of the connection block, and the springs in this connection element are two in number and are each is in the form of a folded leaf or beam, the first end of which is connected to the mobile mass or said other element of the system and the second end of which is connected to one of the extensions of the connection block.

In this case, the two springs mentioned above are preferably symmetric with each other about a plane orthogonal to the mobility plane.

In a third preferred embodiment of the invention, the springs in at least one of the first and the second connection elements are two in number and extend on each side of an extension of the mobile mass or said other element of the system, and each of these springs is in the form of a folded leaf or beam, the first end of which is connected to the extension of the mobile mass or said other element of the system and the second end of which is connected to the connection block.

In this case also, the two springs are preferably symmetric with each other about a plane orthogonal to the mobility plane.

The second and third embodiments of the invention are thus based on the use of so-called folded springs.

In general, the angle between the first and second directions is preferably 90 degrees.

Therefore, the angle between the first and second planes of the first connection device is preferably 90 degrees when the mobile mass is in the rest position.

Furthermore, the first connection element and the second connection element of the first connection device are preferably symmetric with each other about a third plane orthogonal to the mobility plane.

Furthermore, the mobile mass advantageously has a first plane of symmetry and a second plane of symmetry orthogonal to the mobility plane and orthogonal to the first direction and the second direction respectively.

More generally, the shape of the mobile mass is generally invariable by rotation of 90 degrees about its centre of inertia.

Furthermore, the connection means preferably include a second connection device similar to the first connection device and arranged such that the first connection element of the second connection device extends parallel to the second connection element of the first connection device, and such that the first and second connection devices are symmetric with each other relative to a fourth plane orthogonal to the mobility plane.

The fourth plane is preferably also orthogonal to the third plane.

Furthermore, the mobile mass is preferably symmetric relative to the fourth plane.

Furthermore, the connection means preferably comprise third connection devices similar to the first connection device, and such that the assembly of the first, second and third connection devices form a first invariable pattern by rotation of 90 degrees about the centre of inertia of the mobile mass.

The connection means thus have symmetry properties imparting optimum isotropy performances thereto, as will become clearer from the following description. Furthermore, this allows the connection means to cancel torque effects due to the application of a force at a point on the mobile mass other than at its centre of inertia.

Moreover, a cross-section of the mobile mass in the mobility plane is advantageously a square having a diagonal in said fourth plane and two adjacent sides parallel to the first and second planes of symmetry respectively.

As a variant, the cross-section of the mobile mass can be of a different type, for example circular, or an arbitrary shape depending on the type of application for which the system is to be used.

In various advantageous applications, the system can also comprise actuation means to impress oscillations on the mobile mass in the mobility plane.

In one particularly advantageous application, the system is an inertial angular sensor which therefore also comprises detection means to measure the displacement of the mobile mass in the mobility plane.

The system preferably comprises a support that forms said other element of the system, and to which the actuation means are fixed.

The support may be a frame of the system or, as a variant, the support can be mounted free to move relative to a frame of the system.

As a variant or additionally, the system may comprise another mobile mass that forms said other element of the system.

In this case, the actuation means may be interposed between the two mobile masses, and/or possibly between the support and each of the mobile masses. Furthermore, the system is advantageously configured to apply opposite forces to the two mobile masses.

The system can thus operate in a particularly well balanced manner. Balancing of the system, particularly when the system is an inertial angular sector, can increase the precision and stability of such a sensor in the long term.

BRIEF DESCRIPTION OF THE DRAWINGS

The invention will be better understood and other details, advantages and characteristics will become clear after reading the following description given as a non-limitative example with reference to the appended drawings among which.

In all these figures, identical references may denote identical or similar elements.

DETAILED PRESENTATION OF PREFERRED EMBODIMENTS

Figure 1:
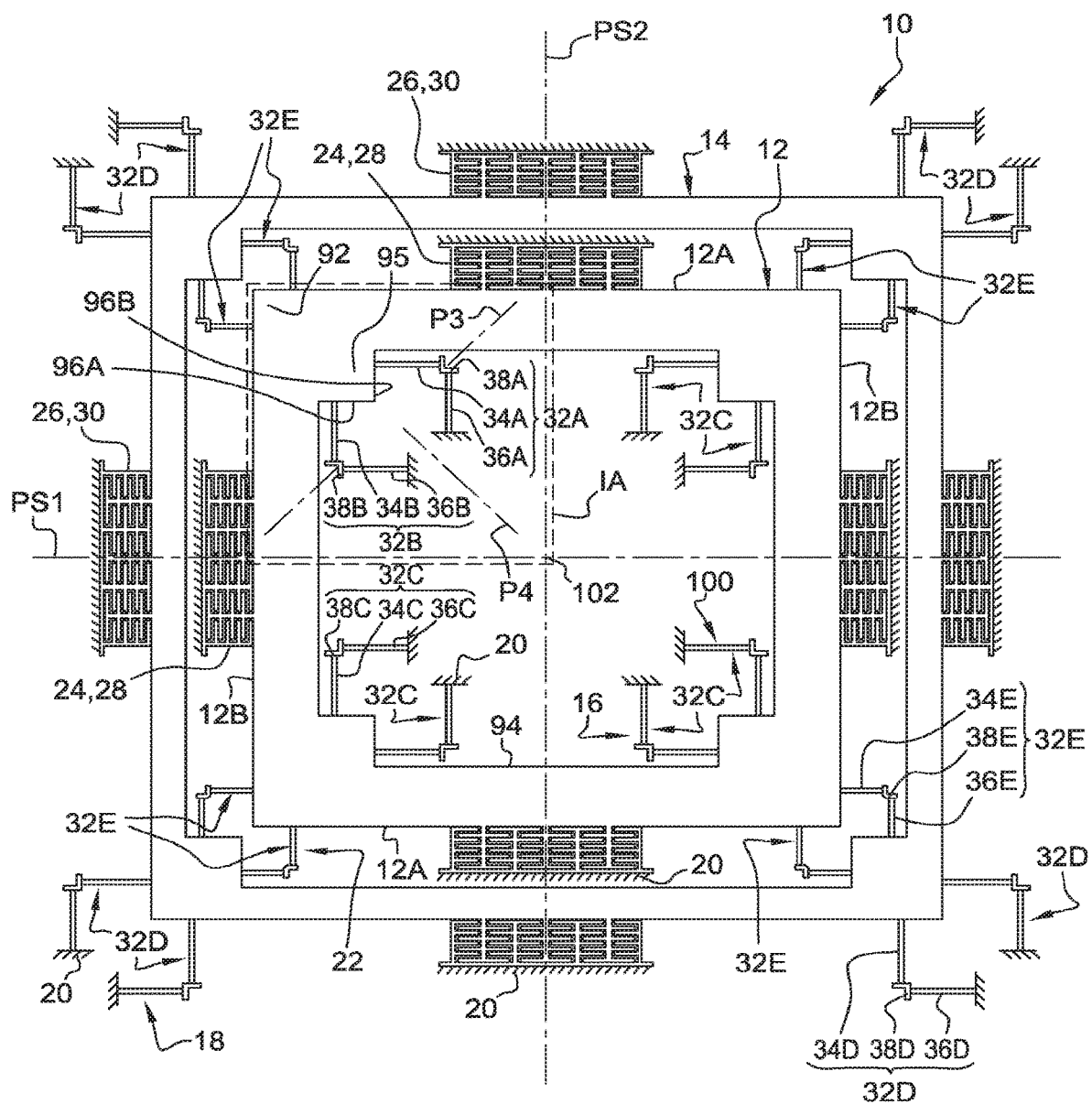
FIG. 1 is a partial diagrammatic top view of an inertial angular sensor according to a first preferred embodiment of the invention.

FIG. 1 illustrates some components of a system 10, for example forming an inertial angular sensor according to a first preferred embodiment of the invention. In particular, this figure shows one mobile mass 12, another mobile mass 14, suspension means 16, 18 to suspend each of the mobile masses 12, 14 respectively to a support 20, and elastic coupling means 22 connecting the two mobile masses 12 and 14 to each other.

The inertial angular sensor 10 illustrated is a MEMS type sensor, but it should be noted that the invention is applicable to sensors of all dimensions, and more generally to other types of systems.

The support 20 extends under the plane of FIG. 1 such that only anchor pads of the different elements to this support 20 are shown, in the form of cross-hatching.

In the terminology used in the appended claims, the suspension means 16, 18 and the elastic coupling means 22 form examples of "connection means" connecting each of the mobile masses 12, 14 to another element of the system. The suspension means 16, 18 connect the mobile masses 12, 14 respectively to the support 20, while the elastic coupling means 22 connect each of the mobile masses 12, 14 to the other mobile mass 14, 12.

In general, the connecting means 16, 18, 22 have two degrees of freedom in translation and one degree of freedom in rotation in the plane of FIG. 1, denoted by reference "P". This plane P is hereinafter called the "mobility plane" because the connection means 16, 18, 22 enable the mobile masses 12, 14 to move in this plane and prevent the mobile masses from moving outside this plane. Such displacements of mobile masses in the mobility plane are obviously limited in amplitude due to the constitution of the above-mentioned connection means, as will become clearer from the following.

In the present description, an orthonormal coordinate system of X, Y, and Z directions is defined, in which the X and Y directions belong to the mobility plane P.

The system 10 also comprises actuation means 24, 26 to impress oscillations on the two mobile masses 12, 14 respectively in the mobility plane P, and detection means 28, 30 to measure the displacement of each mobile mass 12, 14 in this same plane P and use this measurement to deduce a rotation angle or speed of the support 20 relative to an inertial coordinate system, in a manner known in itself. The actuation means 24, 26 and detection means 28, 30 may for example be composed of a plurality of pairs of interdigitised electrostatic combs. In the example illustrated, each pair of interdigitised electrostatic combs belongs to the actuation means 24, 26 and also to the detection means 28, 30. Each pair of interdigitised electrostatic combs acts alternately in actuator mode and in detector mode, the alternation taking place at a higher frequency than the oscillation frequency of the mobile masses 12, 14. As a variant, the actuation means 24, 26 and the detection means 28, 30 can be distinct. In the example illustrated, the actuation means 24, 26 act along the X and Y directions, and the detection means 28, 30 are sensitive to displacements of mobile masses along the X and Y directions.

The suspension means 16 include a first connection device 32A comprising a first connection element 34A, a second connection element 36A, and a connection block 38A connecting the first connection element 34A to the second connection element 36A.

Figure 2:
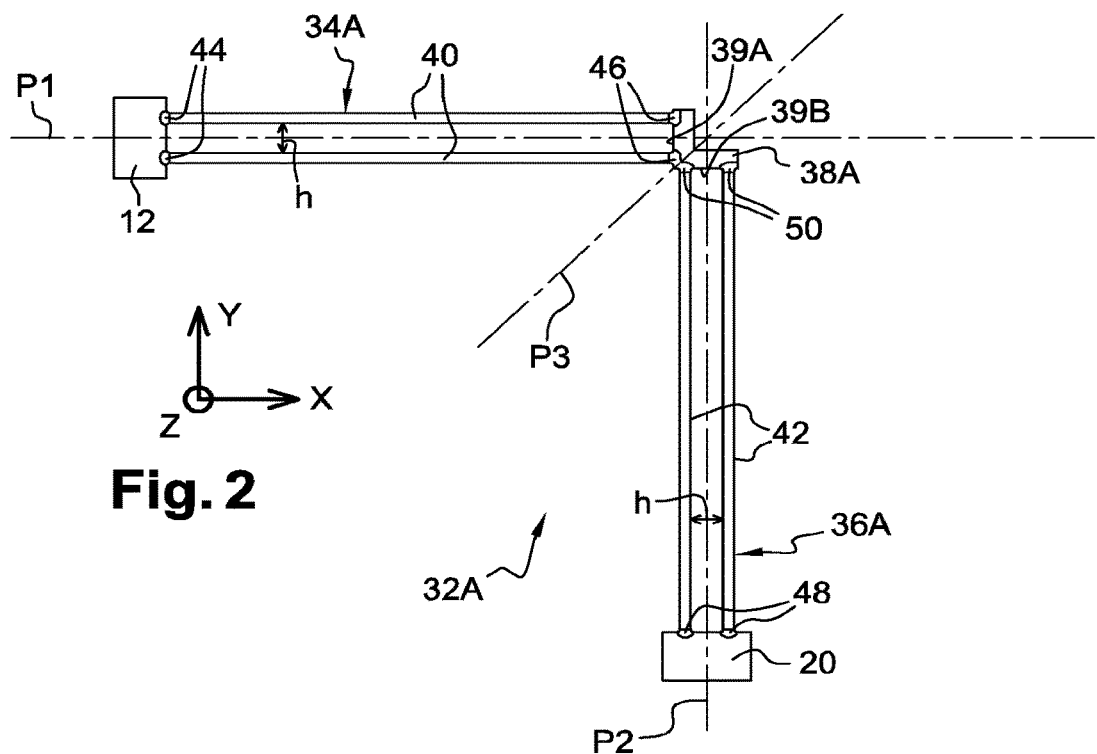
FIG. 2 is a larger scale diagrammatic view of a connection device belonging to the sensor in FIG. 1.

As shown on FIG. 2, the first connection element 34A is composed of two springs 40 capable of deforming in bending in the mobility plane P, and the second connection element 36A is formed from two springs 42 also capable of deforming in bending in the mobility plane P.

As a variant, one only of the connection elements 34A and 36A may be formed from several springs, within the scope of the invention.

In the first embodiment of the invention, the springs 40 and 42 are in the form of leaf springs or beams. The length of the springs 40, 42 is thus their dimension along the X and Y axes respectively, their thickness is their dimension along the Y and X axes respectively, and their width is their dimension along the Z axis corresponding to the direction of the thickness or the depth of the system 10.

The first connection device 32A illustrated on FIG. 2, forms part of the suspension means 16 of the mobile mass 12 (FIG. 1). Consequently, each of the springs 40 of the first connection element 34A has a first end 44 connected to the mobile mass 12 and a second end 46 connected to the connection block 38A, while each of the springs 42 of the second connection element 36A has a first end 48 connected to the support 20 and a second end 50 connected to the connection block 38A.

The orientation of each of the connection elements 34A and 36A is such that bending deformations of the first connection element 34A enable the mobile mass 12 to displace relative to the connection block 38A along a first direction, namely the Y direction, from a position in which the mobile mass 12 is located when the first connection element 34A is in a rest state (in other words with no bending deformation), while bending deformations of the second connection element 36A enable the connection block 38A to move along a second direction, namely the X direction, relative to the support 20, from a position in which the second connection element 36A is in a rest state. A skilled person will understand that to the first order, the mobile mass 12 only moves along the first direction mentioned above under the effect of a bending deformation of the first connection element 34A, and only moves along the second direction mentioned above under the effect of a bending deformation of the second connection element 36A.

In particular, when the mobile mass 12 is in a rest position in which the springs 40, 42 are not loaded in bending as illustrated on FIG. 1, the first connection element 34A is centred relative to a first plane P1 (FIGS. 1A and 2) and the second connection element 36A is centred relative to a second plane P2, the planes P1 and P2 being orthogonal to the mobility plane P and intersecting. In the embodiments illustrated, the planes P1 and P2 are advantageously orthogonal to each other.

Furthermore, the connection block 38A has two faces 39A, 39B orthogonal to each other and to which the first and second connection elements 34A, 36A respectively are connected. If the thickness of the connection block 38A along the Z direction is particularly small, the above mentioned faces can be considered like edges of the connection block.

Thus, the respective second ends 46 of the springs 40 of the first connection element 34A are connected to a first one 39A of the two faces, while the respective second ends 50 of the springs 42 of the second connection element 36A are connected to a second one 39B of the two faces.

In the example illustrated on FIG. 2, the connection block 38A is an element in the form of an angle bracket. The shape of the connection block 38A can obviously be different without going outside the scope of the invention, for example it could be square, rectangular or even triangular. Furthermore, orifices could pass through the connection block 38A along the Z direction, to reduce the mass of this connection block. In the case of a MEMS type system, the connection block 38A may in particular be composed of a junction of extra thicknesses of the ends 46, 50 of springs, or by a deposition of material with an appropriate Young's modulus so as to connect said ends.

Therefore in general, the first connection device 32A may have the special feature of comprising two connection elements 34A, 36A connected to each other through the connection block 38A. A "connection block"' means any element with a greater bending stiffness in the mobility plane P than the bending stiffness of the connection elements 34A, 36A. In practice, it is preferable if the flexibility of the connection block in the mobility plane P is negligible compared with the flexibility of the connection elements 34A, 36A.

It should be noted that the connection block 38A is only connected to the mobile mass 12 and to said other element of the system (in other words to the support 20 in the case of the first connection device 32A) through the connection elements 34A, 36A. Therefore this connection block 38A is itself mobile in the mobility plane P following bending deformations of the connection elements 34A, 36A.

The configuration with two (or more) springs laid out in parallel (in other words with each spring connecting the connection block 38A to the same element) can limit the tendency of the connection block 38A to move in rotation in the mobility plane under the effect of a bending load, in this same plane, of the first connection element 34A or of the second connection element 36A, induced by the application of a force on one of the first ends 44 and 48 and/or on one of the second ends 46, 50.

The connection block 38A thus keeps an approximately constant orientation in the mobility plane P regardless of the direction of the forces applied to the connection device 32A, provided that such forces only generate moderate amplitude displacements, which is the case particularly for oscillations induced by actuation means 24, 26 when the sensor is operating in "gyroscope" mode or in "gyrometer" mode.

As will become clearer in the following, the suspension means 16 also comprise a second connection device 32B and third connection devices 32C, the suspension means 18 comprise fourth connection devices 32D, and the elastic coupling means 22 comprise fifth connection devices 32E. These devices 32B, 32C, 32D, 32E are similar to the first connection device 32A and therefore each device comprises a first respective connection element designated as reference 34B, 34C, 34D, 34E respectively, a second respective connection element designated as reference 36B, 36C, 36D, 36E respectively, and a respective connection block designated as reference 38B, 38C, 38D, 38E respectively.

Obviously, the second connection device 32B and the third connection devices 32C are connected to the mobile mass 12 and to the support 20 in the same way as the first connection device 32A. Concerning the fourth connection devices 32D forming the suspension means 18 of the other mobile mass 14, the first end 44 of each spring 40 of the first connection element 34D is connected to this mobile mass 14. Finally, concerning the fifth connection devices 32E forming the elastic coupling means 22, the first end 44 of each spring 40 of the first connection element 34E is connected to the mobile mass 12 while the first end 48 of each spring 42 of the second connection element 36E is connected to the other mobile mass 14.

Throughout this description, properties common to the connection devices 32A, 32B, 32C, 32D, 32E are described with reference to the first connection device 32A.

Figure 3A:
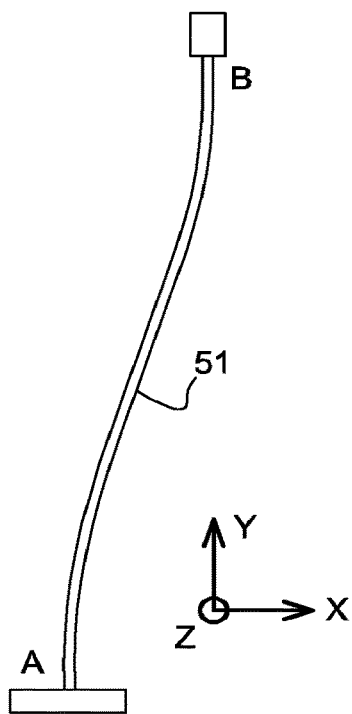
FIGS. 3A to 3C are views similar to FIG. 2, illustrating other types of connection devices that do not form part of the invention, and that are provided only for explanatory purposes.
Figure 3B:
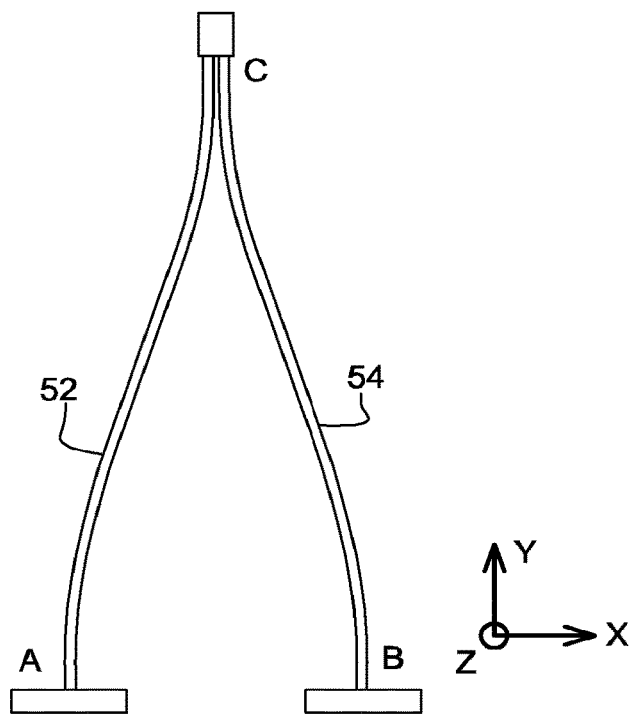
Figure 3C:
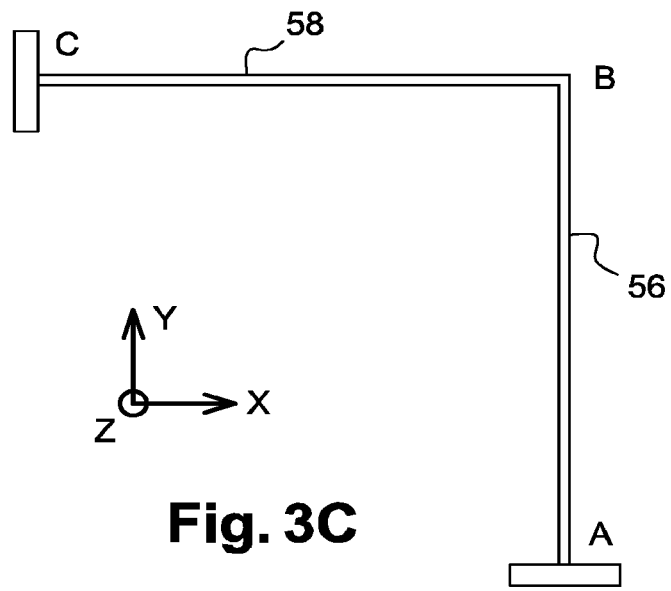

The advantage of the configuration of connection devices according to the invention will be better understood after considering FIGS. 3A to 3C that illustrate other types of connection devices (that do not form part of the invention).

FIG. 3A illustrates a console beam 51 embedded at one of its ends, reference B, and the other end A of which can be moved along the X axis. Therefore, since the end B is fixed, if a zero displacement along the Y axis is imposed on ends A and B, a displacement of end A along the X axis causes an increase in the length of the beam that creates a force along the Y axis. This generates a strong non-linearity of the force along the X axis at the end A as a function of the displacement of this end A along the X axis. This analysis can be compared with the model of the vibrating cord for which the stiffness and therefore the natural frequency vary as a function of the axial tension. If displacement of the end B is allowed along the Y axis, the force along this axis becomes zero. In this case, non-linearity of the force along the X axis at A as a function of the displacement of A is strongly reduced, such that all that remains is a purely geometric non-linearity.

This is why the uni-axial springs usually used are folded springs, the principle of which is illustrated in FIG. 3B. This figure shows two leaf springs 52 and 54 (that can be considered as two beams in the plane), connected to each other through one of their ends C, and having each of their other two ends separated. These two springs are generally two portions of a single spring, in which case the end C is obtained by folding the spring, hence the name of this type of spring. In the example in FIG. 3B, the folded spring is of the uniaxial type.

The end C is free to move along the Y axis, while the end A is still constrained to move along the X axis, and the end B is held fixed along the two axes X and Y. Consequently, the forces along the Y axis in the two springs or beams 52 and 54 are zero, a force along the X axis at A then only has a purely geometric non-linearity without any prestress as a function of the displacement at end A along the X axis. Unlike a simple beam, the folded spring thus enables a very large reduction in the third order non-linearity, also called the "cubic non-linearity".

However, this principle cannot be directly extended to suspensions with two axes.

FIG. 3C illustrates a suspension with two axes composed of two springs or beams 56 and 58 orthogonal to each other. The stiffness of the embedment of beam 56 at the end B along the Y axis induced by the other beam 58 is significantly less than the stiffness of the cantilever beam in FIG. 3A due to the flexibility of the beam 58 along the Y axis. The result is that non-linearities related to prestress are strongly reduced. The ratio between non-linearities related to prestress and applicable to the suspension with two axes shown in FIG. 3C and the embedded cantilever beam in FIG. 3A, is of the same order as the ratio of the stiffness of a beam in bending to its stiffness in compression.

However, with this type of suspension, a displacement of end A along the X axis induces a non-negligible rotational displacement of end B, which causes a large purely geometric non-linearity.

We will now reconsider the connection device 32A in FIG. 2. In this device, the stiffness in rotation at the connection block 38A is reduced due to the multiplicity of springs forming the first connection element 34A and the second connection element 36A. This rotational stiffness depends particularly on the separation distance h between the springs in the same connection element.

Due to geometric non-linearities, a relative displacement of the region in which the first ends 44 are anchored to the mobile mass 12 along the Y axis causes a horizontal displacement of the connection block 38A, resulting in a stress along the X axis in the springs 40 induced by bending of the springs 42. But as in the case of the suspension in FIG. 3C, this stress is much lower than the stress applied to the embedded cantilever beam in FIG. 3A, because the bending stiffness of a beam is itself much less than its stiffness in tension/compression.

Non-linear finite element calculations were made for a "MEMS" type device in order to compare the devices in each of FIGS. 2 and 3A-3C.

For each of these calculations, the maximum displacement along the Y axis is fixed at 1 µm, the length of the springs is 290 µm, and their thickness is 6 µm. Conventionally, the depth of a "MEMS" device along the Z axis is equal to 60 µm and the material used is silicon.

The results of these calculations are given below in the form of 3rd order polynomial regressions of the force ε (in Newtons) relative to the displacement y (in millimetres) along the Y axis, for:

the cantilever beam (FIG. 3A):

$\varepsilon=2.6206y+2.3065\times10^{-38}y^2+49697y^3$;

the folded spring (FIG. 3B):

$\varepsilon=2.6147y-2.0498\times10^{-38}y^2+64,223y^3$;

the two-axis suspension (FIG. 3C):

$\varepsilon=2.5669y+14.055y^2+101.73y^3$;

the connection device 32A (FIG. 2), with a separation distance h of 10 µm:

$\varepsilon=2.5091y+0.94931y^2-25.25y^3$;

the connection device 32A, with h=20 µm:

$\varepsilon=2.6030y+0.24324y^2+0.045001y^3$;

the connection device 32A, with h=38 µm:

$\varepsilon=2.6484y+0.073074y^2+40.100y^3$.

Therefore these results confirm that the connection device 32A can considerably reduce the 3rd order non-linearity, provided that a judicious choice of the value of the separation distance his made (namely in the above example, h=20 µm).

Similarly, a reduction in the 3rd order non-linearity can be obtained even when only one of the connection elements 34A or 36A is composed of several springs, the other possibly being composed of a single spring, at least for displacements induced by the bending deformation of the connection element 34A or 36A that is composed of several springs.

Moreover, in preferred embodiments of the invention the first connection element 34A and the second connection element 36A are symmetric with each other about a third plane P3 orthogonal to the mobility plane P. Therefore the two connection elements are in particular similar to each other.

The result is a second advantage of the connection device 32A due to the isotropic properties of this device. Isotropy refers to the capability of the device 32A to respect a displacement law as a function of the applied force that is independent of the direction of application of the force.

The symmetric configuration of the two connection elements 34A and 36A and the fact that rotational displacements of the connection block 38A are prevented or at least very much limited, has the consequence that, in the first order, the two connection elements 34A and 36A of the connection device 32A behave like two independent springs similar to each other, along the Y axis and the X axis respectively. The displacement law as a function of the applied force for each of these equivalent springs can be deduced from the above polynomial regression for the folded spring. This polynomial regression gives a negligible 2nd order coefficient and a moderate 3rd order coefficient, such that for small displacements, this law can be approximated to the first order by a relation of type:

Fy=k y, for the first connection element 34A, and

Fy=k y, for the second connection element 36A.

Consequently, regardless of the direction along which the connection device 32A is loaded, the elastic force F applied by the device in response to such a load corresponds, to the first order, to the sum of the forces Fx and Fy exerted by the equivalent linear springs along the X axis and the Y axis respectively, namely:

$$F=Fx+Fy=kx+ky=k(x+y)$$

Therefore the connection device 32A acts like a linear spring with the same stiffness coefficient k relative to any load in the mobility plane P. Consequently, this device respects a law for displacement as a function of the force that to the first order, does not depend on the orientation of the force in the mobility plane P.

Figure 4:
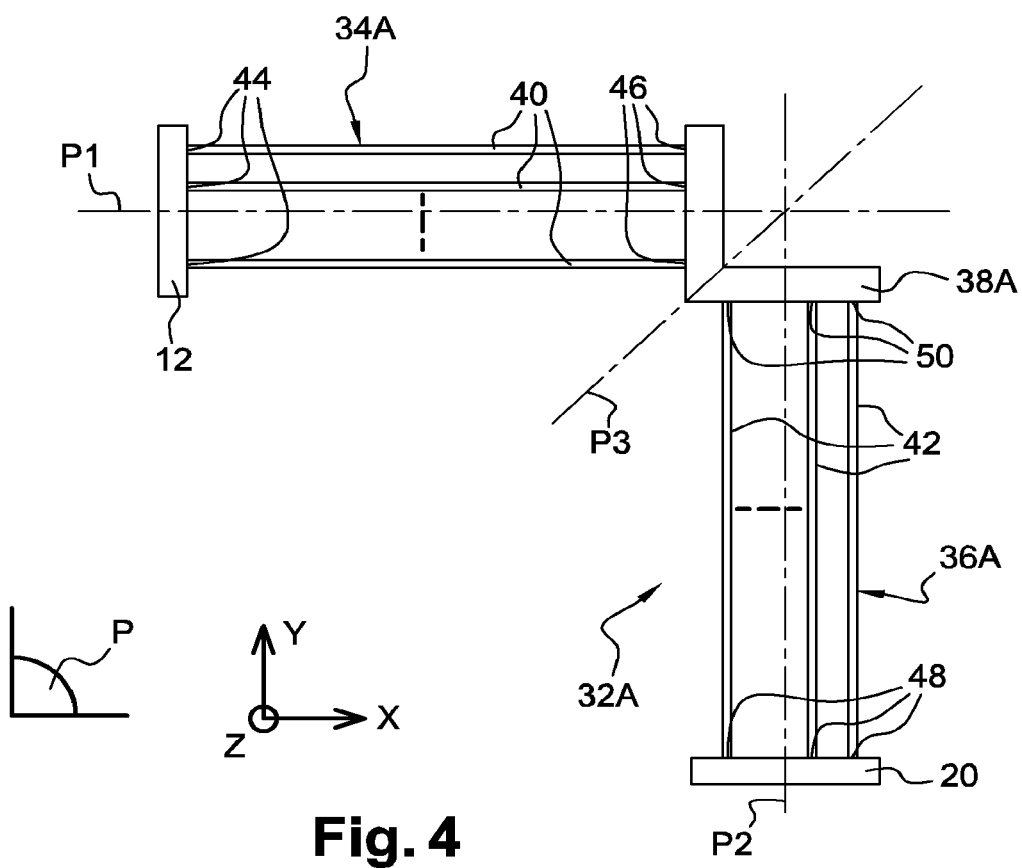
FIGS. 4 to 6 are views similar to FIG. 2, illustrating connection devices of systems according to other embodiments of the invention.
Figure 5:
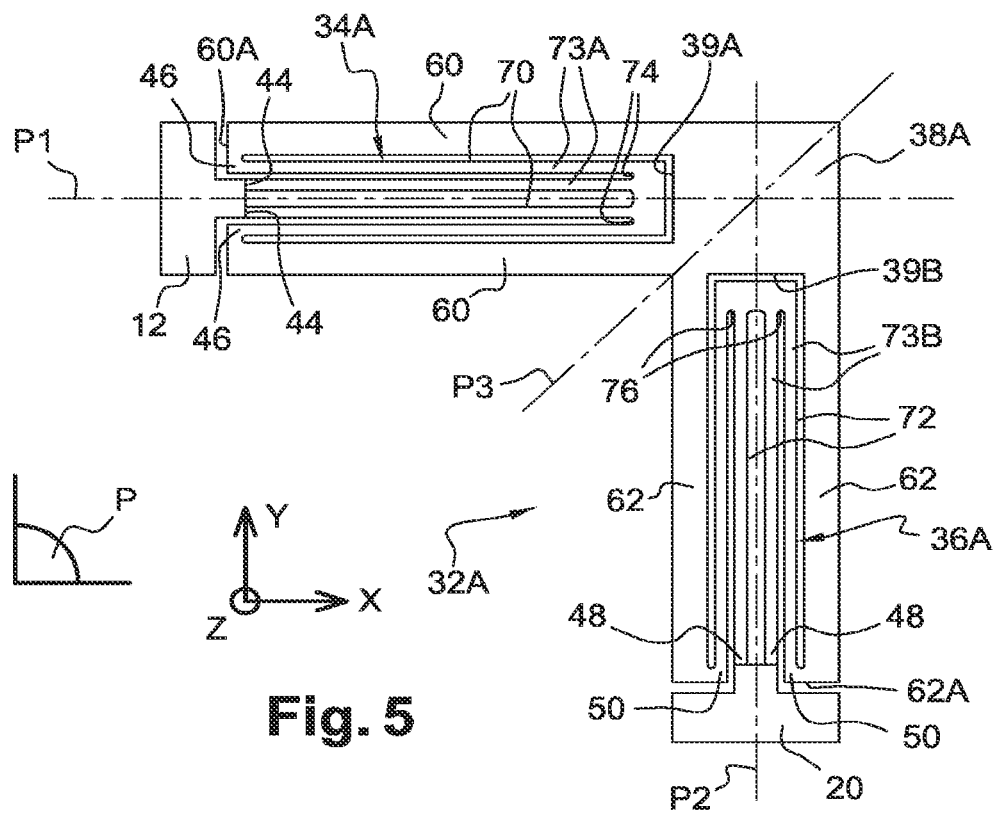
Figure 6:
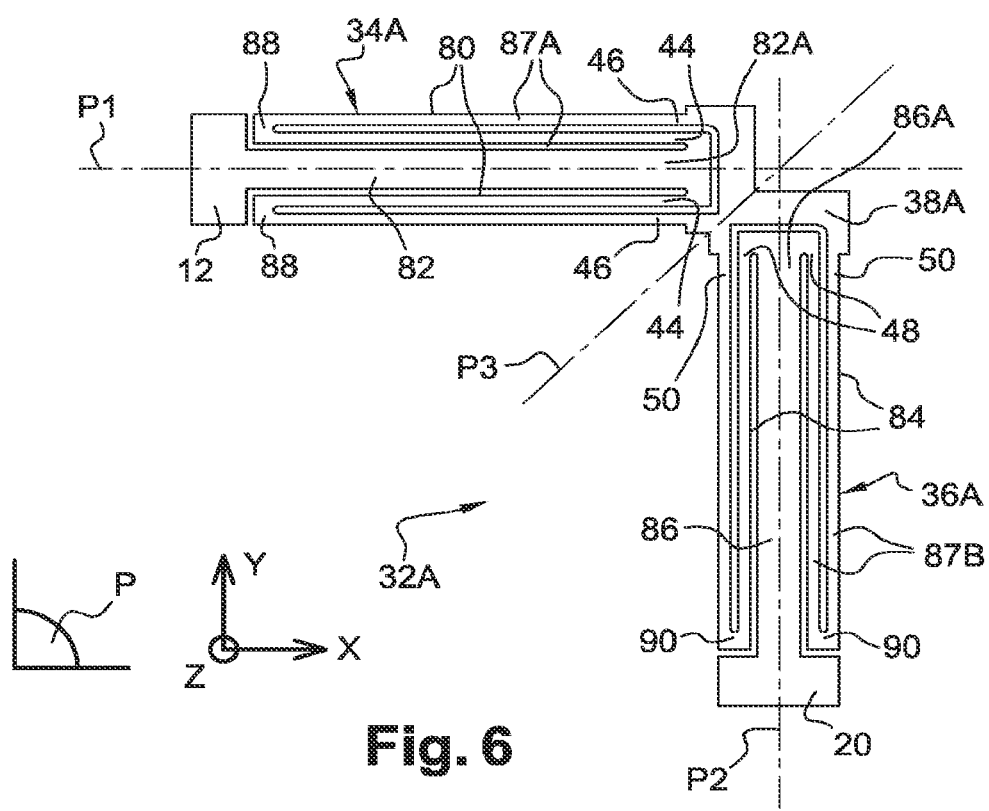

FIGS. 4 to 6 illustrate variants of the connection device 32A, that have advantages of the same nature as those described above for the device in FIG. 2.

Thus, in the example illustrated in FIG. 4, each connection element 34A, 36A comprises three or more springs 40, 42. This can further increase the rotational stiffness at the connection block 38A.

In a second embodiment of the invention illustrated on FIG. 5, each of the first and second connection elements 34A, 36A extends between two corresponding extensions 60, 62 of the connection block 38A, namely two extensions 60 facing each other starting from the first face 39A of the connection block 38A, and two extensions 62 extending facing each other starting from the second face 39B of the connection block 38A.

Furthermore, there are two springs 70, 72 for each connection element 34A, 36A and each is in the form of a folded leaf or beam. In other words, these springs are of the "folded" type and therefore correspond to the spring in FIG. 3B. The first end 44 of each spring 70 of the first connection element 34A is connected to the mobile mass 12 and the second end 46 of each spring 70 is connected to a corresponding extension 60 of the connection block 38A, for example to a distal end 60A of the extension 60. Similarly, the first end 48 of each spring 72 of the second connection element 36A is connected to the support 20 and the second end 50 of each spring 72 is connected to a corresponding extension 62 of the connection block 38A, for example to a distal end 62A of the extension 62.

As shown on FIG. 5, each spring 70 is thus elongated along a direction parallel to the first plane P1. Similarly, each spring 72 is elongated along a direction parallel to the second plane P2.

Preferably, each spring 70 comprises two straight portions 73A with the same length, extending parallel to the first plane P1 and connected to each other at the fold 74 of the spring. Similarly, each spring 72 comprises two straight portions 73B with the same length, extending parallel to the second plane P2 and connected to each other at the fold 76 of the spring. The ends 44 and 46 are thus arranged to be facing each other. The same applies for the ends 48 and 50.

In the example illustrated, the folds 74 of the springs 70 of the first connection element 34A are connected to each other. The same applies for the corresponding folds 76 of the springs 72 of the second connection element 36A. This configuration constrains the springs 70 (and 72) to work in parallel and to limit the degrees of freedom of the connection device 32A.

In a third embodiment of the invention illustrated on FIG. 6, there are two springs 80, 82 for each of the first and second connection elements 34A, 36A. Furthermore, the springs 80 of the first connection element 34A extend on each side of an extension 82 of the mobile mass 12, while the springs 84 of the second connection element 36A extend on each side of an extension 86 of the support 20. Each of these springs 80, 84 is in the form of a folded leaf or beam. The second end 46, 50 of each of the springs 80, 84 is connected to the connection block 38A. Moreover, the first end 44 of each spring 80 is connected to the extension 82 of the mobile mass 12, for example at a distal end 82A of this extension, while the first end 48 of each spring 84 is connected to the extension 86 of the support 20, for example to a distal end 86A of this extension 86.

As shown on FIG. 6, each spring 80 is thus elongated along a direction parallel to the first plane P1. Similarly, each spring 84 is elongated along a direction parallel to the second plane P2.

Preferably, each spring 80 comprises two straight portions 87A with the same length, extending parallel to the first plane P1 and connected to each other at the fold 88 of the spring. Similarly, each spring 84 comprises two straight portions 87B with the same length, extending parallel to the second plane P2 and connected to each other at the fold 90 of the spring. The ends 44 and 46 are arranged to be facing each other. The same applies for the ends 48 and 50. Finally, the folds 88 of the springs 80 are arranged facing the mobile mass 12, while the folds 90 of the springs 84 are located facing the support 20.

In all the preferred embodiments, the springs of the first connection element 34A extend from a first end of the connection block 38A while the springs of the second connection element 36A extend from a second end of the connection block 38A.

It will be clear to a skilled person that the connection device 32A cannot fulfil its function as described above unless the connection block 38A is only connected to the first and the second connection elements 34A, 36A, otherwise the connection device 32A would be unable to provide elastic suspension or coupling between the mobile mass 12 and the support 20. In other words, the connection block 38A is independent of all elements other than the first and the second connection elements 34A, 36A.

In particular, FIG. 1 illustrates an example layout of connection means 16, 18, 22 to obtain optimum benefit from linearity and isotropy properties of the connection devices inside a system, such as an inertial angular sensor.

In the system 10 illustrated, the mobile mass 12 is globally in square annular form and it has a first plane of symmetry PS1 parallel to the first plane P1 of the first connection device 32A and a second plane of symmetry PS2 parallel to the second plane P2 of the first connection device 32A. These planes of symmetry PS1 and PS2 are orthogonal to the mobility plane P.

Furthermore, the suspension means 16 of the mobile mass 12 also comprise the second connection device 32B similar to the first connection device 32A, arranged such that the first connection element 34B of the second connection device 32B extends parallel to the second connection element 36A of the first connection device 32A, and such that the first and the second connection devices 32A, 32B are symmetric with each other about a fourth plane P4 orthogonal to the mobility plane P and to the third plane P3. Furthermore, the fourth plane P4 forms another plane of symmetry (distinct from planes PS1 and PS2) for the mobile mass 12, actually a diagonal plane of the mobile mass 12.

It should be noted that in other advantageous embodiments in which only one of the connection elements of each of the connection devices 32A and 32B is composed of two or more springs, the connection devices 32A and 32B can be images of each other by axial symmetry about an axis orthogonal to the mobility plane P and passing through the third plane P3 (for example this axis corresponding to the intersection between the third plane P3 and the fourth plane P4 in FIG. 1).

Furthermore, the first and the second connection devices 32A, 32B are arranged close to a corner 92 of the mobile mass 12. In the example illustrated, the suspension means 16 are arranged inside the mobile mass 12. This mobile mass comprises indentations on its internal edge 94 arranged at its four corners, and meeting so as to form a square protuberance 95 at each inside corner of the mobile mass 12. This protuberance 95 has sides 96A, 96B parallel to the sides 12A, 12B respectively of the mobile mass 12 and offset from these sides, and a diagonal plane coincident with a corresponding diagonal plane of the mobile mass 12. The connection elements 32A, 32B are connected to sides 96B, 96A respectively of the corresponding protuberance 95, symmetrically on each side of the diagonal plane of this protuberance 95, that is coincident with the fourth plane P4.

The suspension means 16 also comprise the third connection devices 32C similar to the first connection device 32A and such that the first, second and third connection devices 32A, 32B, 32C form a first pattern 100 invariable by rotation of 90 degrees about a centre of inertia 102 of the mobile mass 12.

For example, the third connection devices 32C are distributed in three pairs of devices, each pair being similar to the pair composed of the first and the second connection devices 32A, 32B and being connected to a corresponding protuberance 95.

The illustrated system 10 thus provides an example in which the suspension means 16 have a globally isotropic nature, in addition to their good linearity performances.

Furthermore, as mentioned above, the illustrated system 10 comprises another mobile mass 14 with the same mass as the mobile mass 12 and arranged such that the centres of inertia of each of the mobile masses 12 and 14 are coincident. For example, the other mobile mass 14 forms a square frame surrounding the mobile mass 12. The latter may be a solid part or it may be perforated. The other mobile mass 14 is connected to the support 20 by suspension means 18, and is coupled to the mobile mass 12 by elastic coupling means 22. As shown in FIG. 1, the suspension means 18 and the elastic coupling means 22 are arranged in a similar manner to the suspension means 16 described above and therefore form a second pattern and a third pattern respectively invariable by rotation of 90 degrees about the centre of inertia 102. Thus, the suspension of the other mobile mass 14 and the elastic coupling of the two mobile masses 12, 14 also have good linearity performances and are globally isotropic.

Finally, in the example described, the actuation means 26 of the other mobile mass 14 are designed to confer oscillations on this other mobile mass 14 in opposite phase with respect to the oscillations of the mobile mass 12 induced by the actuation means 24 of this mobile mass 12. Thus, the global centre of inertia of the two global masses 12, 14 remains practically static during operation. In other words, the actuation means 24, 26 and the connection means 16, 18, 22 permanently apply the same magnitude forces to the two mobile masses 12, 14 in opposite directions, so that operation of the system 10 is perfectly balanced.

The sensor 10 can thus be used not only in "gyrometer" mode, in other words the operating mode in which the Coriolis force applied to the two mobile masses 12, 14 is measured, but also in "gyroscope" mode, in other words the operating mode in which an angular drift in the direction of oscillation of the two mobile masses 12, 14 can provide information directly about rotation of the sensor 10 about an axis parallel to the Z direction.

Figure 1A:
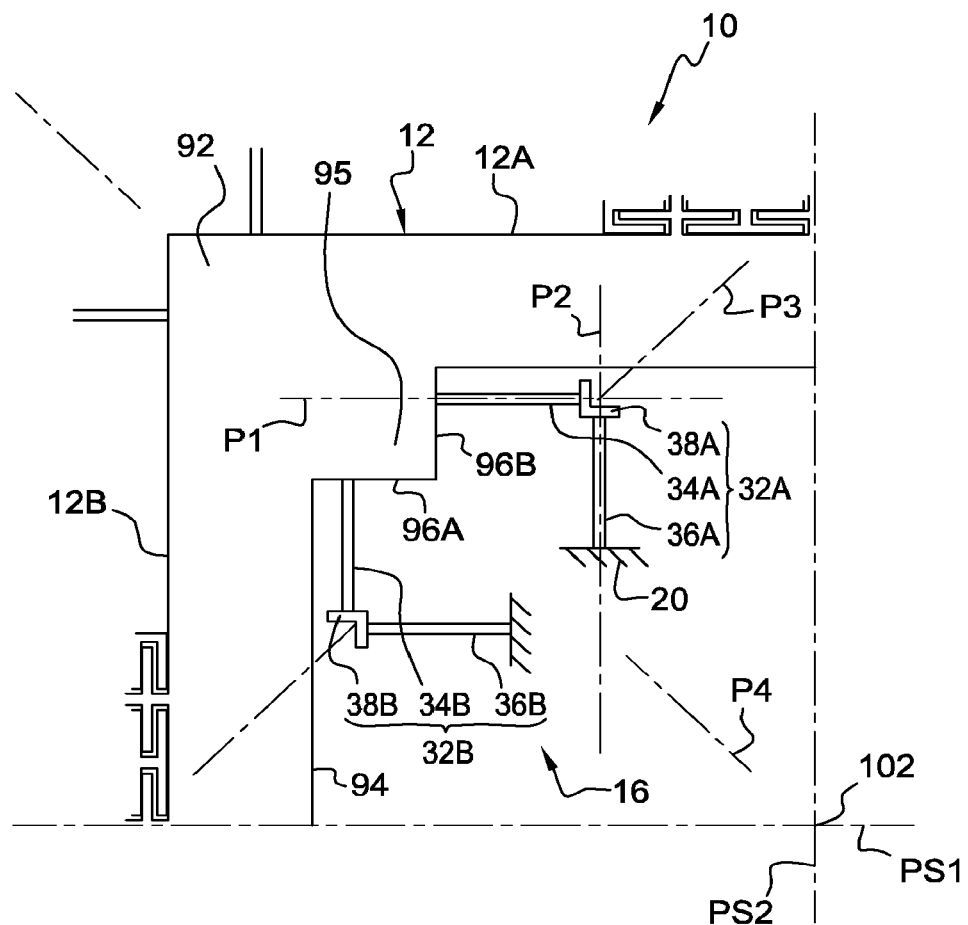
FIG. 1A is a larger scale view of detail 1A in FIG. 1.
Figure 1A:
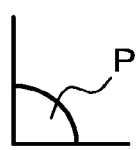
Figure 1A:
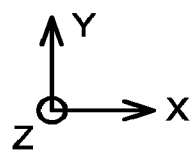

Obviously, the configuration of the sensor 10 that can be seen on FIGS. 1 and 1A is only given as an illustrative example and other types of sensors, or more generally systems, can make advantageous use of the connection device disclosed by the invention. For example, they may be balanced sensors for which the two mobile masses are arranged side by side, and/or sensors in which the two mobile masses are coupled though mechanical coupling devices, or sensors that have a single mobile mass or that have three or more mobile masses, and/or sensors for which the support is installed free to move relative to a frame so that active balancing means can be used. It may also be used for various resonant systems, or switches.

In the particularly advantageous application described above, it is clear that linear and isotropic connection devices can be used to make a vibrating gyroscope resonator with degenerated vibration modes in the plane. Furthermore, the particular geometry of the connection devices described above makes it possible to orient the natural modes preferably along the geometric axes of the resonator and make this orientation relatively insensitive to any manufacturing defects that could introduce asymmetries in the springs.

The invention claimed is:

1. A mobile mass suspension system, comprising:
at least one mobile mass,
connection means connecting the mobile mass to another element of the system, so as to allow the mobile mass to move in a mobility plane, relative to said other element of the system,
wherein the connection means comprise a first connection device comprising a first connection element connected to the mobile mass, a second connection element connected to said other element of the system, and a connection block connecting the first connection element to the second connection element and movable in the mobility plane,
wherein, when the mobile mass is in a rest position, the first and the second connection elements are centred with respect to a first plane and a second plane respectively that are orthogonal to the mobility plane and that intersect,
wherein the first connection element is deformable in bending in the mobility plane so as to enable displacement of the mobile mass relative to the connection block along a first direction orthogonal to the first plane, starting from the rest position, and the second connection element is deformable in bending in the mobility plane to enable relative displacement of said other element of the system relative to the connection block along a second direction orthogonal to the second plane, starting from the rest position,
and wherein at least one of
the first connection element is formed of at least two springs, each of which having a first end connected to the mobile mass and a second end connected to the connection block, and
the second connection element is formed from at least two springs, each of which having a first end connected to the other element of the system and a second end connected to the connection block.

2. The system according to claim 1, wherein the first connection element is formed from the at least two springs each of which has a first end connected to the mobile mass and a second end connected to the connection block, and the second connection element is formed from the at least two springs each of which has a first end connected to said other element of the system and a second end connected to the connection block.

3. The system according to claim 1, wherein each of the springs in at least one of the first and the second connection elements is in the form of a straight leaf or beam.

4. The system according to claim 3, wherein a number of springs in at least one of the first and second connection elements is greater than or equal to three.

5. The system according to claim 1, wherein at least one of the first and second connection elements extends between two corresponding extensions of the connection block, and the springs in this connection element are two in number and are each in the form of a folded leaf or beam, the first end of which is connected to the mobile mass or said other element of the system and the second end of which is connected to one of the extensions of the connection block.

6. The system according to claim 1, wherein the springs in at least one of the first and the second connection elements are two in number and extend on each side of a corresponding extension of the mobile mass or of said other element of the system, and each of these springs is in the form of a folded leaf or beam, the first end of which is connected to the extension of the mobile mass or of said other element of the system and the second end of which is connected to the connection block.

7. The system according to claim 1, wherein an angle between the first and second directions is 90 degrees.

8. The system according to claim 1, wherein the first connection element and the second connection element of the first connection device are symmetric with each other about a third plane orthogonal to the mobility plane.

9. The system according to claim 8, wherein the connection means also comprise:
- a second connection device comprising a third connection element arranged such that the third connection element of the second connection device extends parallel to the second connection element of the first connection device, wherein the first and the second connection devices are symmetric with each other about a fourth plane orthogonal to the mobility plane and to the third plane; and
- third connection devices wherein the first, second and third connection devices form a first pattern invariable by rotation of 90 degrees about a centre of inertia of the mobile mass.

10. The system according to claim 1, wherein the mobile mass has a first plane of symmetry and a second plane of symmetry which are both orthogonal to the mobility plane and are orthogonal to the first direction and the second direction respectively.

11. The system according to claim 9, wherein the mobile mass has a first plane of symmetry and a second plane of symmetry which are both orthogonal to the mobility plane and are orthogonal to the first direction and the second direction respectively, and wherein a cross-section of the mobile mass in the mobility plane is a square having a diagonal in said fourth plane and two adjacent sides parallel to the first and second planes of symmetry respectively.

12. The system according to claim 1, further comprising actuation means to impress oscillations on the mobile mass in the mobility plane.

13. An inertial angular sensor, composed of a system according to claim 12 that also comprises detection means to measure the displacement of the mobile mass in the mobility plane.

14. The inertial angular sensor according to claim 13, further comprising a support that forms said other element of the system, and to which the actuation means are fixed.

15. The inertial angular sensor according to claim 13, further comprising another mobile mass that forms said other element of the system, the system being configured to apply opposite forces in the mobility plane to the two mobile masses.

* * * * *